United States Patent Office 3,702,878
Patented Nov. 14, 1972

3,702,878
CYCLIC ORGANOPHOSPHORUS COMPOUNDS
AND PROCESS FOR MAKING SAME
Toranosuke Saito, Kobe-shi, Japan, assignor to Sanko
Chemical Co., Ltd., Kurume-shi, Japan
No Drawing. Filed Dec. 31, 1969, Ser. No. 889,689
Int. Cl. C07d *105/04;* A01n *9/36;* B01j *1/16*
U.S. Cl. 260—936                    11 Claims

ABSTRACT OF THE DISCLOSURE

New organophosphorus compounds of the general formulas (I) 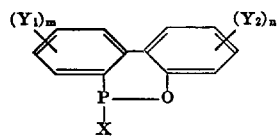

(II) 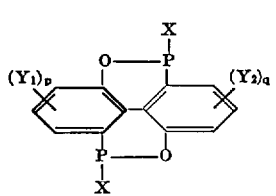

(III) 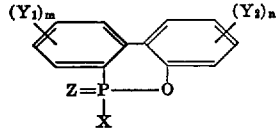

(IV) 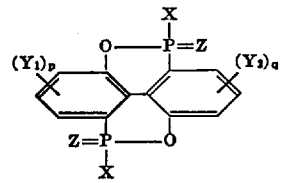

(V) 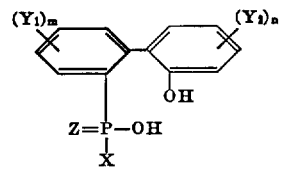

and (VI) 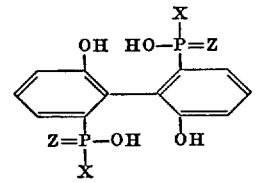

wherein X is hydrogen or halogen or hydroxyl amino, alkyl alkoxy, alkylthio, aryloxy or arylthio radicals; $Y_1$ and $Y_2$ which may or may not be the same are halogen or alkyl, aryl, alkoxy, aryloxy acyl, nitro, cyano, or sulfonic acid radicals, including the case where the substituted radicals $Y_1$ and $Y_2$ combine with a biphenyl ring to form a phenanthrene ring; Z is oxygen, sulfur or two halogen atoms; m and n are an integer ranging from 0 to 4; and p and q are an integer ranging from 0 to 3 are obtained by condensation of phosphorus compounds and orthophenylphenol derivatives in the presence of a catalyst, with the subjection, if desired, of the product to a known chemical procedure. The compounds thus obtained are useful as insecticides, fungicides, antioxidants for high-molecular compounds, etc.

This invention relates to new organophosphorus compounds and a method of preparing the same.

In recent years various organophosphorus compounds have found applications, for example, as insecticides, fungicides, flame-retardants, and antioxidants for organic compounds, in many different sectors of the industry. New, valuable organophosphorus compounds, if provided on a commercial basis, would greatly contribute to the further progress of the industry.

It is, therefore, an object of the present invention to provide new organophosphorus compounds useful as insecticides, fungicides, flame-retardants, antioxidants for organic compounds and so forth.

Another object of the invention is to provide a process whereby such compounds can be produced on an industrial basis.

For the purpose of this invention, the term new organophosphorus compounds is used to mean those of the general formulas as follows:

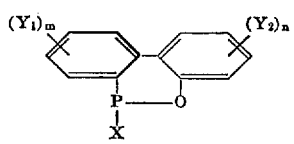 (I)

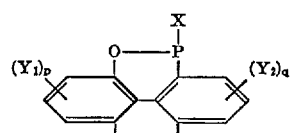 (II)

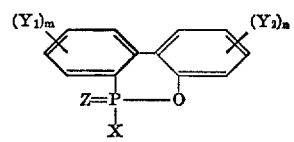 (III)

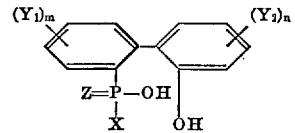 (IV)

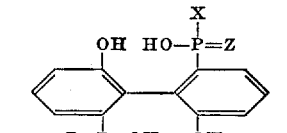 (V)

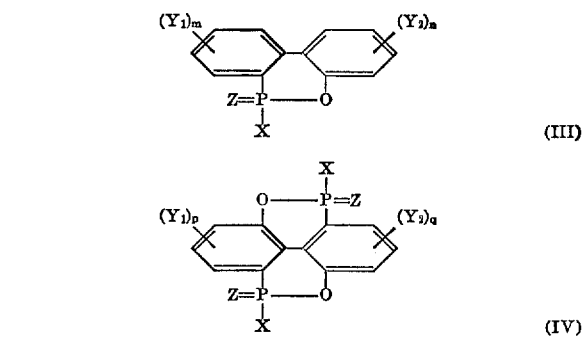 (VI)

wherein X is hydrogen, halogen, hydroxyl radical, amino radical, alkyl radical having 1 to 22 carbon atoms, alkylthio radical, aryloxy radical or arylthio radical having 1 to 22 carbon atoms; $Y_1$ and $Y_2$ which may or may not be the same are halogen, alkyl radicals or aryl radicals having 1 to 18 carbon atoms, alkoxy radicals or aryloxy radicals having 1 to 18 carbon atoms, or substituted radicals such as acyl having 2 to 18 carbon atoms, nitro, cyano, or sulfonic acid radicals, including the case where the substituted radicals, including the case where the substituted radicals $Y_1$ and $Y_2$ combine with with a biphenyl ring to form a phenanthrene ring; Z is oxygen, sulfur or two halogen atoms; $m$ and $n$ are whole numbers ranging from 0 to 4; and $p$ and $q$ are whole numbers ranging from 0 to 3.

Since it is practically difficult to mention all of the novel organophosphorus compounds of the invention by nomenclature, typical of them are represented by the structural formulas as follows:

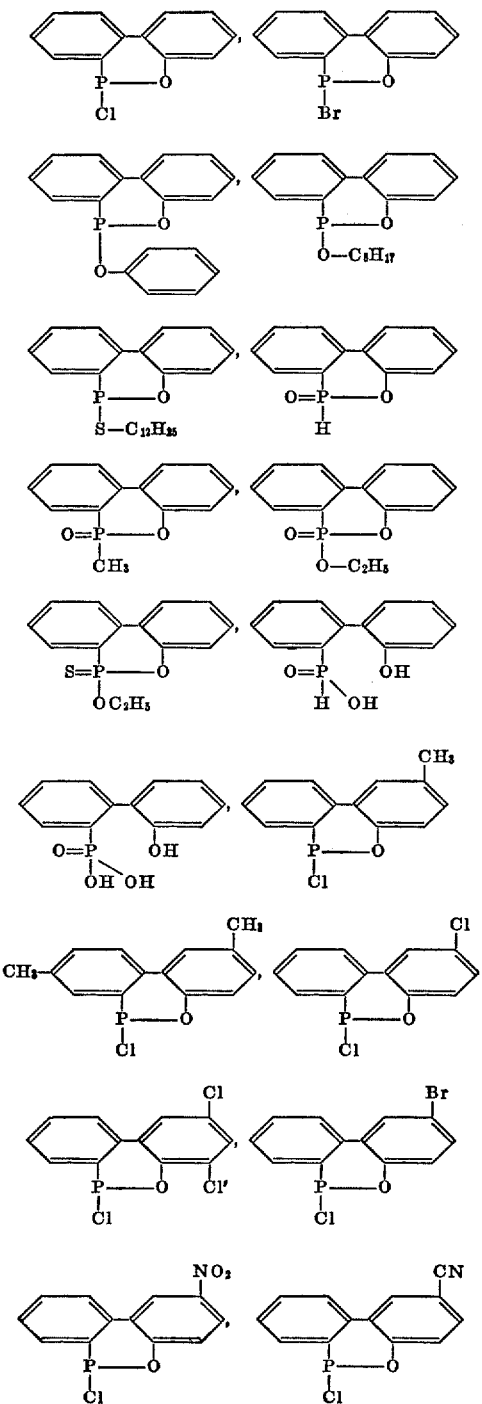

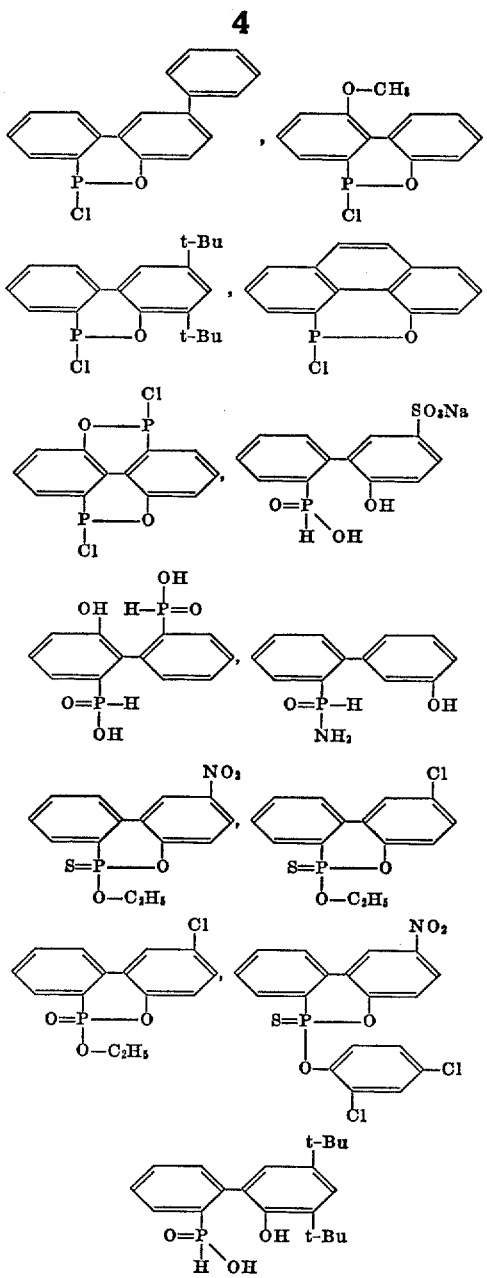

etc.

The new organophosphorus compounds according to the present invention are obtained by heat-condensation of one or more compounds of the general formula

 (VII)

wherein $X_1$, $X_2$ and $X_3$ may or may not be the same, representing halogen or aryloxy radicals and an ortho-phenylphenol of the general formulae

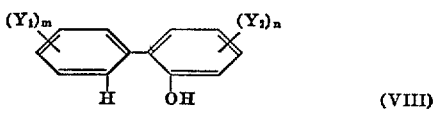 (VIII)

or

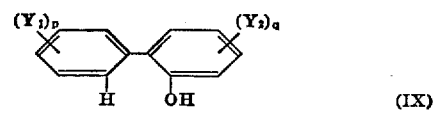 (IX)

wherein $Y_1, Y_2$, $m$, $n$, $p$ and $q$ denote the same as above or a derivative thereof in the presence of a catalyst, with or without subsequent conventional chemical procedures.

Typical compounds of the general Formula VII include phosphorus trichloride, phosphorus tribromide, triphenyl phosphite, phenoxydichlorophosphine, diphenoxychlorophosphine and so forth.

Among the compounds of the general Formulas VIII and IX are orthophenylphenol, 2-hydroxy-5-methylbiphenyl,
2-hydroxy-5,4'-dimethylbiphenyl,
2-hydroxy-5-chlorobiphenyl,
2-hydroxy-3,5-dichlorobiphenyl,
2-hydroxy-5-nitrobiphenyl,
2-hydroxy-5-bromobiphenyl,
2-hydroxy-5-cyanobiphenyl,
2-hydroxy-2'-methoxybiphenyl,
2-hydroxy-3,5-ditertiarybutylbiphenyl,
2,4-diphenylphenol,
4-hydroxyphenanthrene,
2,2'-dihydroxybiphenyl and so forth.

Useful catalysts for the present invention are the metals of Groups I$b$, II$b$, III$a$, III$b$, IV$a$, and IV$b$ of the Periodic Table and their halides, and ferrous metals and their halides. The catalysts which may be employed include copper, copper chlorides, zinc, zinc chloride, aluminum, aluminum chloride, scandium chloride, tin, tin chlorides, zirconium chloride, chromium chloride, and iron chlorides.

In principle, the compounds of hte Formulas VII and VIII or IX are reacted in stoichiometrical equivalents, whereby a chemical process as typically expressed by the following chemical equation is concluded:

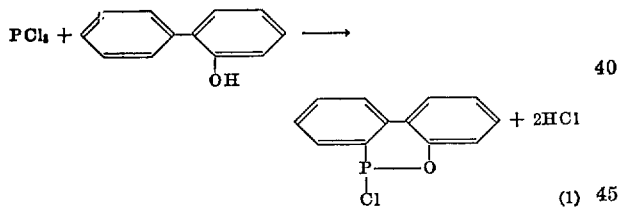

(1)

Where the compounds of the Formulas VII and VIII or IX are reacted at any ratio other than the chemical equivalents as represented by the chemical equation given above, then any one of the chemical processes as typically represented by the following chemical equations may be resorted to in carrying out the present invention:

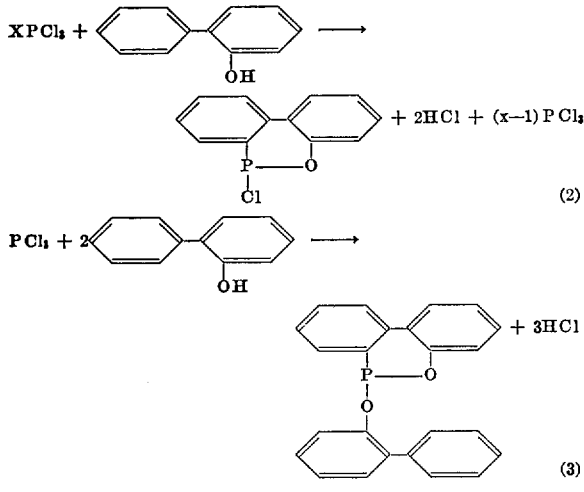

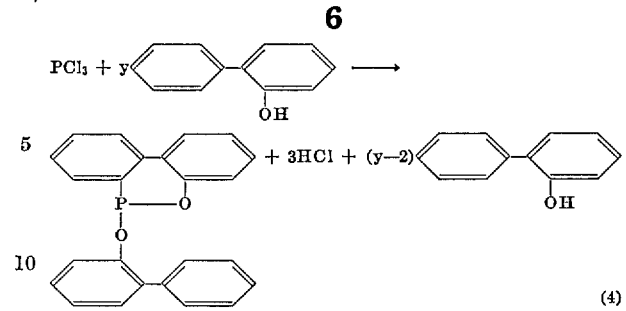

wherein $x$ is a larger than 1 and $y$ is larger than 2.

Appropriate types and amounts of the catalyst to be used are governed by the types and amounts of the starting materials that are reacted. Generally, the amount of the catalyst required is very small where the compound of the Formula VII is a phosphorus trihalide and the compound of Formula VIII or IX is such that the substituted radicals $Y_1$ and $Y_3$ therein are halogen, nitro radicals, alkyl radicals, aryl radicals, alkoxy radicals or aryloxy radicals, or where the starting materials are free from the $Y_1$ and $Y_2$, or where the reaction is carried out in accordance with any of the chemical Equations 1, 2 and 3. An increased amount of the catalyst may be used, according to the necessity, where either the $Y_1$ or $Y_2$ of the compound of the Formula VIII is an acyl radical or cyano radical or where the reaction is effected as represented by the chemical Equation 4. In practice, it is desirable to adjust the quantitative ratio of the compounds of the Formulas VII and VIII or IX to be reacted together, in such a manner that the end product can be obtained with the least possible amount of the catalyst. When one of the compounds of the Formula VII is triphenyl phosphite, the reactions involved are represented by the following chemical equations:

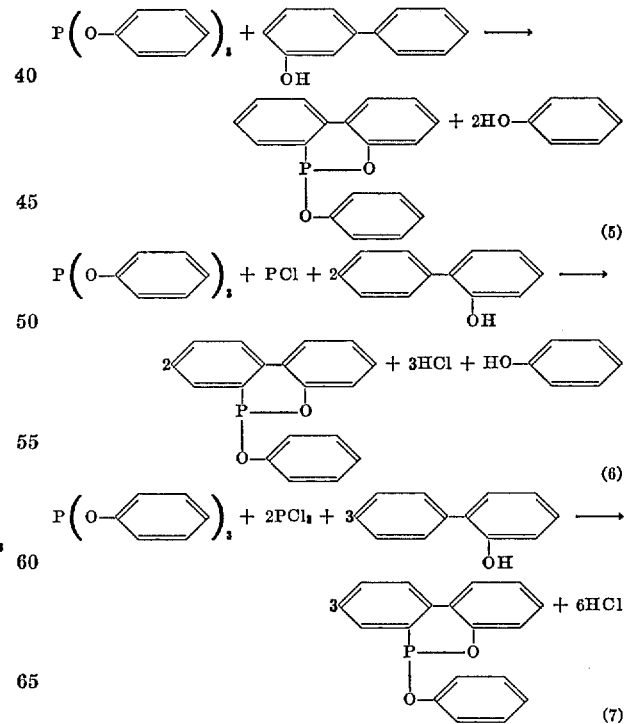

Reactions according to the chemical Equations 4, 5 and 6 give a hydroxy compound on the right side of each equation. Such a reaction which goes through the process of any such chemical equation should be avoided, wherever possible, because the hydroxy compound left behind inactivates the catalyst and necessitates the use of the catalyst in an amount large enough to counteract the effect of the compound.

The reaction temperature may vary in the range from 50° to 300° C. In the case where the $Y_1$ and $Y_2$ in the Formula VIII or IX are electronegative radicals as, for example, halogen, nitro radicals, acyl radicals, cyano radicals, or the like, the procedure of condensation in the chemical equation will not proceed smoothly and will call for more active catalyst. At the same time, it is desirable to effect the reaction at a temperature comprised between 200° and 250° C. Where the substituted radicals above mentioned are not electronegative, the reaction is in many cases carried out at 100° to 200° C.

The chemical change represented by the Equation 1 actually consists of two chemical processes. One is an esterification reaction of a phosphorus trihalide and phenolic hydroxyl radical, as typically represented by the equation:

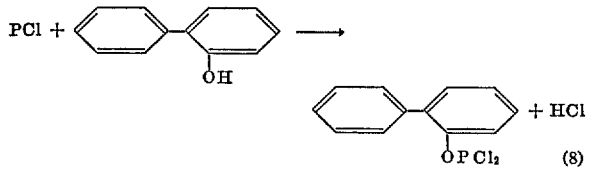

Although the use of a catalyst is not essential for the process above formulated, the presence of the catalyst often accelerates the reaction velocity of the process. The other process is a cycling reaction due to the desorption of hydrogen atom and halogen coupled to phosphorus from the biphenyl ring. The presence of a catalyst is indispensable for this reaction, which is represented by the following equation:

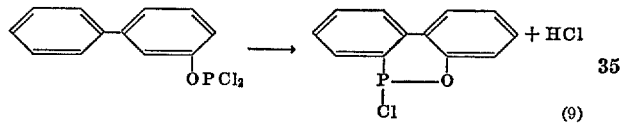

Aside from the processes described above which are indispensable for the production of the new organic compounds according to the present invention, some simple chemical procedures may be additionally made to obtain valuable derivatives of the compounds of the present invention. For the purpose of the invention, the simple chemical procedures include hydrolysis, esterification, ester interchange, oxidation, alkylation, sulfonation and other procedures known in the art. Some of such procedures may be represented by the following chemical equations:

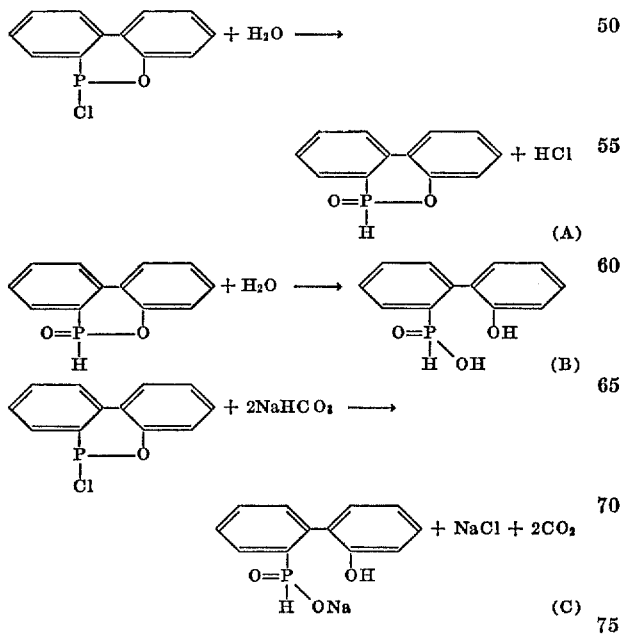

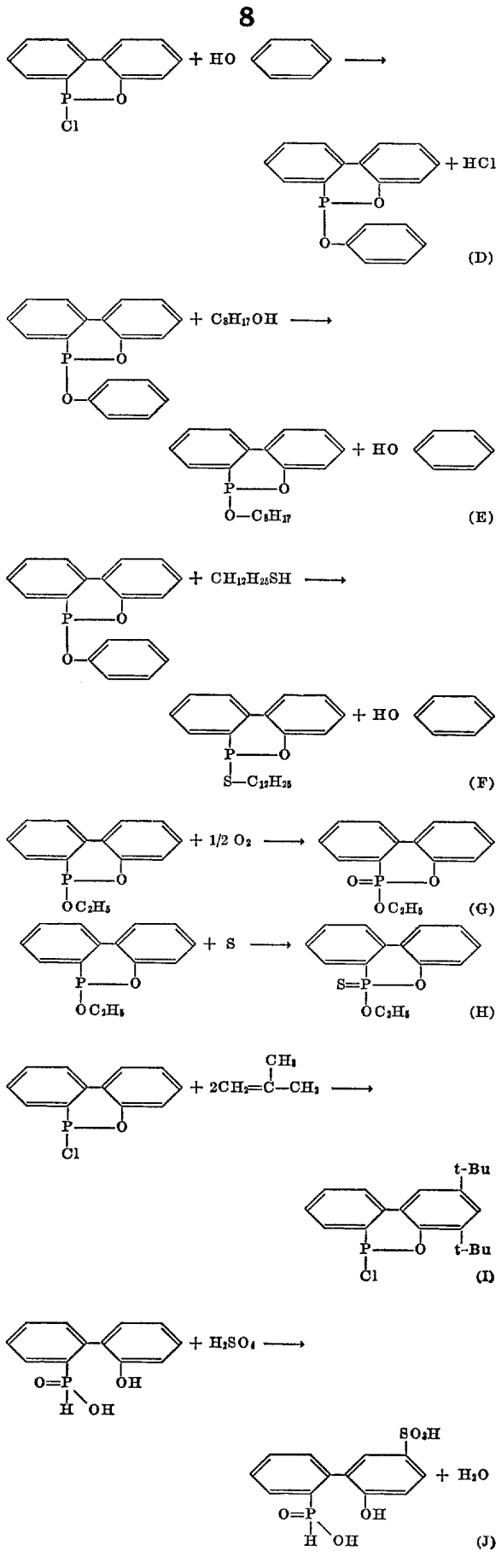

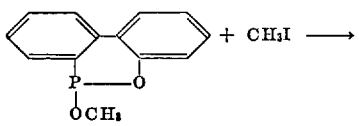 + CH₃I ⟶

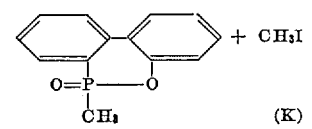 + CH₃I  (K)

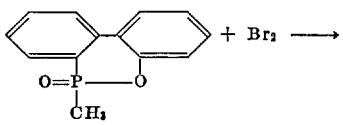 + Br₂ ⟶

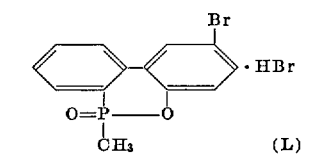 · HBr  (L)

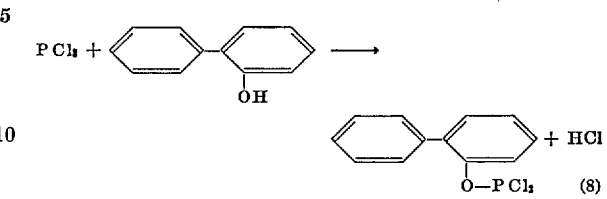 (M)

The procedures of the Equations A and B represent hydrolyzing reactions, which usually proceed at room temperature. In particular, the reaction (A) is exothermic. In the case of the Equation C, the reaction proceeds in an aqueous solution of sodium bicarbonate at room temeprature. The procedure (D) is for esterification, where the reaction takes place in the range from room temperature to 200° C. To complete this reaction it is necessary to add excess phenol and cause a reaction at 200° C. for 10 hours. The Equations E and F represent ester interchange reactions, which are effected in the presence of sodium alkoxide, sodium mercaptide or sodium phenolate, at 50° to 200° C. The Equations G and H pertain to oxidation, and the reaction proceeds exothermically at 50° to 200° C. The reaction for alkylation (I) proceeds at 50° C. to 150° C., and here a useful catalyst is Friedel-Crafts'. The Equation J is for sulfonation. The reaction of the Equation K, known as Michaelis Arbusov's reaction, takes place at temperatures below 50° C. The Equation L represents halogenation on the biphenyl nucleus, the reaction being accelerated by the presence of ferric chloride, iodine, etc. The Equation M represents halogenation of phosphorus atom. Here the reaction is exothermic and progresses violently.

The present invention is illustrated by the following examples, which are in no way limitative.

EXAMPLE 1

Into a 500-ml., three-necked flask equipped with an agitator, a thermometer and a reflux cooler are placed 204 g. (1.2 mols) of orthophenylphenyl (2-hydroxybiphenyl) and 206 g. (1.5 mols) of phosphorus trichloride. Except for the top of the reflux cooler, all of the reactor components are fitted together to provide a complete seal against the atmosphere. The top of the reflux cooler is suitably arranged for the discharge of hydrogen chloride gas to be produced by the reaction. On completion of the preparation the charge inside the reactor is gradually heated. When the temperature of the contents has risen to 35° C. the solid orthophenylphenol is dissolved to a homogeneous liquid. At this point the agitator is actuated. The charge is further heated to 50° C., when one can clearly see hydrogen chloride gas being produced by the reaction. As heating is kept on from this point upward the reaction mixture vigorously generates hydrogen chloride gas, and in about three hours the thermometer reading reaches 140° C. Around this point the generation of hydrogen chloride gas sharply dwindles or terminates. Here the reactor and the contents are weighed together, when a weight reduction of 62 g. is noted. If it is assumed that by the procedure above described a chemical process as represented by the chemical equation

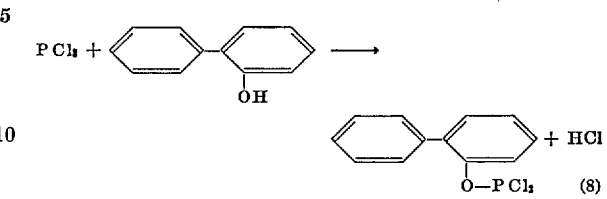

is completed, then it theoretically indicates that 1.2 mols (44 g.) of hydrogen chloride gas is removed out of the reactor. The larger actual weight loss than the theoretical value is presumably attributed to entrainment of the vapor of phosphorus trichloride by the hydrogen chloride gas. If the weight of the phosphorus trichloride which is entrained at the cooling water temperature of 12° C. in the reflux cooler is calculated and the weight so calculated is deducted from the actual weight loss, the balance generally agrees with the theoretical value above given. Next, 1.2 g. of zinc chloride is introduced into the reactor, and the reaction mixture is heated. Again hydrogen chloride gas is generated and the thermometer reads 120° C. With the lapse of time, the generation of hydrogen chloride gas persists and the thermometer reading rises by degrees. Upon rise of the melt temperature to 210° C., the rate of hydrogen chloride gas generation drops sharply. When compared with the weight of the charge immediately after the addition of zinc chloride, the weight at this point indicates a decrease of 61 g. one can imagine from this that, throughout the whole operation above described, two dissimilar stoichiometric processes are carried out. The resultant, upon distillation at a reduced pressure of 20 mm. Hg, affords a fraction at about 195° C. which when cooled becomes solid. It takes the form of white crystals, M.P. 87° C. By the measurement of molecular weight, elementary analysis, nuclear magnetic resonance and absorption spectrum analysis and other analytical means, the reaction product is identified to have the structural formula

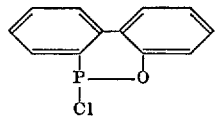

EXAMPLE 2

Into a 500 ml., four-necked flask equipped with means similar to those employed in Example 1 plus a dropping funnel are introduced 239 g. (1 mol) of 2-hydroxy-3,5-dichlorobiphenyl, 137 g. (1 mol) of phosphorus trichloride, and 1 g. of aluminum chloride. The mixture is heated in such a manner that phosphorus trichloride is slowly refluxed while hydrogen chloride gas is being generated. Gradually the thermometer reading rises, up to 200° C. in about 5 hours. At this point 41 g. (0.3 mol) of phosphorus trichloride is gradually dropped through the dropping funnel with care taken not to cause a drop of the thermometer reading below 200° C. If the total quantity of phosphorus trichloride is added all at once, the reaction mixture becomes unable to maintain the high temperature of 200° C. despite continued heating, because the phosphorus trichloride is simply refluxed. For this reason, a total period of about 15 hours is required before the final drop is added to the charge. Then, the reaction mixture is heated at 200° to 230° C. for 10 hours. The pressure inside the reactor is reduced and excess phosphorus trichloride is removed. The resultant, upon distillation at a high degree of vacuum, gives a lightly yellowish solid matter. By analytical means similar to those resorted to Example 1, the product is identified to possess the structural formula

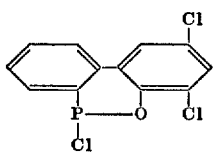

EXAMPLE 3

Into a reactor equipment similar to the one employed in Example 1 are introduced 93 g. (0.3 mol) of triphenyl phosphite, 202 g. (1.1 mols) of 2-hydroxy-5-methyl biphenyl, 151 g. (1.1 mols) of phosphorus trichloride, and 1 g. of ferric chloride. With the application of heat, the temperature of the mixture is gradually increased. Upon arrival at about 200° C. the mixture is maintained at that temperature for about 5 hours, when the generation of hydrogen chloride gas no longer takes place. At the same temperature the pressure inside the reactor is reduced and excess phosphorus trichloride is eliminated. Then, the reactor pressure is increased back to the atmoshperic pressure, 30 g. (ab. 0.3 mol) of phenol is added, and the mixture is heated at 210° C. for 6 hours. Excess phenol is distilled off under vacuum, and the residue is distilled at 2 mm. Hg. A reaction product as a fraction at about 220° C. is obtained. In the same way as described in the preceding example, this product is identified to have the structural formula

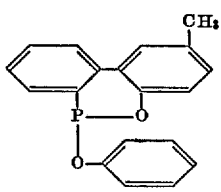

EXAMPLE 4

Into an equipment similar to the one used in Example 2 are placed 186 g. (1 mol) of 2,2'-dihydroxy-biphenyl, 275 g. (2 mols) of phosphorus trichloride, and 0.5 g. of zinc chloride. In the same manner as described in Example 2 the mixture is heated to generate hydrogen chloride gas. Phosphorus trichloride from a dropping funnel is slowly added to the reaction mixture lest the temperature should drop below 180° C. The point where the generation of hydrogen chloride gas no longer takes place at that temperature is regarded as the terminating point of the reaction. After removal of excess phosphorus trichloride and recrystallization of the residue from toluene, a substance of the structural formula

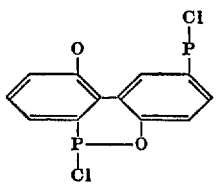

results.

EXAMPLE 5

The substance

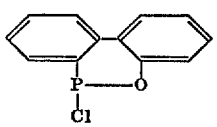

obtained by Example 1 may be further subjected to simple chemical procedure to derive a useful substance therefrom.

Into a two-liter beaker, 1000 g. of water and 116 g. (1.1 mols) of sodium carbonate are placed and the latter is dissolved. To the resulting aqueous solution is added 234 g. (1 mol) of the substance

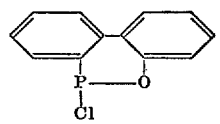

obtained by Example 1. The mixture reacts while generating carbonic acid gas and gives an almost transparent, homogeneous liquid. With the addition of about 10 g. of active carbon, the liquid is filtered, and 1.2 mols of hydrogen chloride is added to the filtrate. The product, in the form of white crystals, has the structure

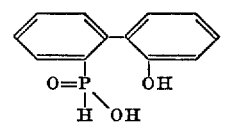

Upon recrystallization from a mixed solvent of ethanol-water at a mixing ratio by volume of 2:1, the product yields white powder, M.P. 105° C. This compound has an outstanding effect as an antioxidant for organic high-molecular compounds.

EXAMPLE 6

Into a 500-ml., three-necked flask are placed 235 g. (1 mol) of a compound of the formula

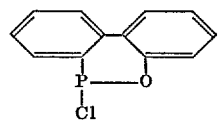

and 122 g. (1.3 mols) of phenol. With the provision of a thermometer and a gas outlet tube, the mixture in the reactor is gradually heated to higher temperatures, when the reaction proceed with violent generation of hydrogen chloride gas. The temperature is increased by degrees to 210° C. and is maintained on that level. One of the flask's mouths is provided with a gas inlet, through which nitrogen gas at the same temperature is blown in at a rate of about 20 liters per hour. After removal of excess phenol under reduced pressure, there is left as the residue a substance of the structural formula

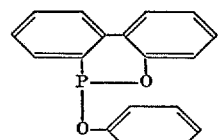

EXAMPLE 7

In a 500-ml. distiller equipped with a thermometer, one gram of metallic soda is dissolved in 158 g. (1 mol) of isodecyl alcohol. With the addition of 234 g. (0.8 mol) of the substance

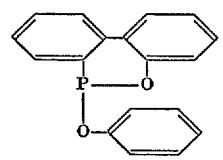

obtained by Example 6, the mixture is kept at about 100° C. for one hour. Next, the pressure inside the distiller is reduced, and phenol that results is removed by distillation. Finally, the pressure is reduced to 5 mm. Hg and the temperature of the contents is increased to 190° C., so that the phenol produced by the reaction and excess isodecyl alcohol are distilled off. The residue is cooled to 100° C. and filtered with 10 g. of dry activated clay, when a liquid having the structure

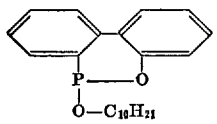

results. The product is highly effective as an antioxidant for polystyrol, polyvinyl chloride, polypropylene, etc.

EXAMPLE 8

By the same procedure as described in Example 7 excepting that isodecyl alcohol is replaced by lauryl mercaptane, a substance represented by the formula

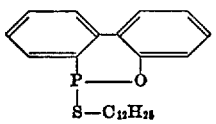

is obtained. The substance is very effective as an antioxidant for polyolefins.

EXAMPLE 9

One hundred and forty-six grams of the substance

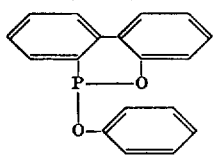

obtained in accordance with Example 6 is heated to about 80° C. It develops heat and reacts with 16 g. of sulfur powder that is added gradually. After the addition, the reaction mixture is kept at about 80° C. for one hour, and then cooled. White crystals result. For the product a structural formula

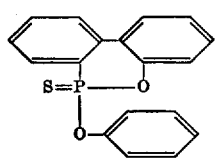

is given.

EXAMPLE 10

Two hundred and ninety-two grams (1 mol) of the substance

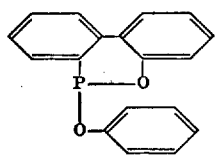

obtained by Example 6 is introduced into a 500 ml., three-necked flask equipped with an agitator, a thermometer, and a reflux cooler. With the addition of 38 g. (1.2 mols) of methanol and 10 g. of methyl iodide, the vessel is carefully heated to increase the temperature of the contents to 80° C. At about this point the reaction begins and produces a large quantity of heat. Therefore, the vessel must be suitably cooled to keep the temperature of the reaction mixture from exceeding the above limit. High above the temperature limit, the heat development would be so vigorous that the temperature would be beyond control. When kept at the specified temperature for about 4 hours, the heat development becomes negligible, indicating that the reaction velocity has slowed down. Then, the temperature is increased and kept at 120° C. for one hour. The resultant is subjected to fractional distillation under reduced pressure. The objective substance is distilled out under reduced pressure of 2 mm. Hg, as a 180°–220° C. fraction. The fraction, upon recrystallization from toluene, yields white crystals, M.P. 124° C. The structural formula of the products is

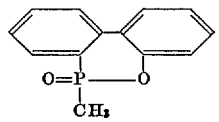

This substance forms complex compounds with copper salts, which exhibit remarkable anti-yellowing effects when added to polyamides.

EXAMPLE 11

Into a 500-ml., four-necked flask equipped with an agitator, a thermometer, a reflux cooler, and a dropping funnel is introduced 246 g. (1 mol) of the substance

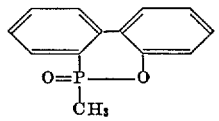

obtained by Example 10. The flask is heated to 130° C., when the substance melts. At that temperature, 176 g. (1.1 mols) of bromine is gradually added dropwise. After dropping over about 2 hours, the mixture is kept at the same temperature for a further period of one hour. Then, the dropping funnel is removed, a gas inlet is provided, and nitrogen gas is blown in at a rate of 20 liters per hour, for one hour. Unreacted bromine and some hydrogen bromide are driven off. Meanwhile, 1000 g. of an aqueous solution containing 10% sodium carbonate is placed in a 2-liter beaker. The above reaction mixture is introduced with stirring into this beaker and is dissolved in the aqueous solution. Next, it is neutralized with 10% dilute sulfuric acid and is precipitated. The resulting precipitate, upon washing with water and drying, yields a compound of the formula

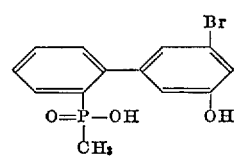

When heated at or over 150° C., the compound loses one molecule of water and changes into

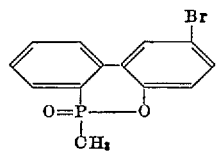

What is claimed is:

1. Organophosphorus compounds of the general formulas (I)  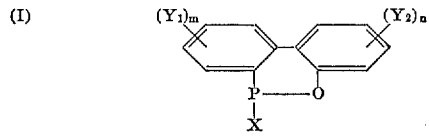

and (III)  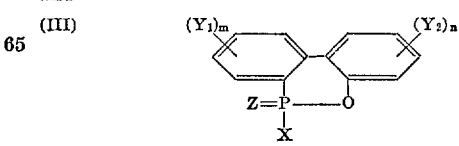

wherein X is hydrogen, halogen, hydroxyl, amino, alkyl having 1 to 22 carbon atoms, alkoxy having 1 to 22 carbon atoms, alkylthio, aryloxy or arylthio having 1 to 22 carbon atoms, $Y_1$ is alkyl having 1 to 18 carbon atoms, $Y_2$ is halogen, alkyl having 1 to 18 carbon atoms, alkoxy having 1 to 18 carbon atoms, nitro, cyano or sulfonic acid radical, and $Y_1$ and $Y_2$ combined with a biphenyl ring form a phenanthrene ring; Z is oxygen, sulfur or two halogen atoms; $m$ and $n$ are whole numbers ranging from 0 to 4.

2. A method of producing organophosphorus compounds of the general Formula I or III which comprises heat-condensing one or more phosphorus compounds of the general Formula VII $$P{\overset{\displaystyle X_1}{\underset{\displaystyle X_3}{-X_2}}}$$

wherein $X_1$, $X_2$ and $X_3$ which may or may not be the same are halogen or aryloxy radicals with an orthophenylphenol of the general Formula VIII (Formula VIII: biphenyl with $(Y_1)_m$ and $(Y_2)_n$ substituents, H and OH groups)

wherein $Y_1$, $Y_2$, $m$, and $n$ signify the same as defined in claim 1 or a derivative thereof, in the presence of at least one of the metals of Groups Ib, IIb, IIIa, IIIb, IVa and IVb of the Periodic Table, ferrous metals, and their halides.

3. An organophosphorus compound having the structural formula (structure with P—O, Cl)

4. An organophosphorus compound having the structural formula (structure with P—O, O—phenyl)

5. An organophosphorus compound having the structural formula (structure with P—O, O—R)

wherein R is an alkyl radical having 1 to 22 carbon atoms.

6. An organophosphorus compound having the structural formula (structure with P—O, S—R)

wherein R signifies the same as defined in claim 5.

7. An organophosphorus compound having the structural formula (structure with O=P—O, H, t-Bu, t-Bu)

8. An organophosphorus compound having the structural formula (structure with O=P—O, $NO_2$, O—$C_2H_5$)

9. An organophosphorus compound having the structural formula (structure with S=P—O, Cl, O—$C_2H_5$)

10. An organophosphorus compound having the structural formula (structure with O=P—O, $CH_3$)

11. An organophosphorus compound having the structural formula (structure with O=P—O, Br, $CH_3$)

References Cited

UNITED STATES PATENTS 3,239,492    3/1966    Spooneer _____ 260—936 X

LEWIS GOTTS, Primary Examiner

A. H. SUTTO, Assistant Examiner

U.S. Cl. X.R.

252—400; 260—45.8 R, 503, 502.4 R, 502.4 P, 502.5, 551 P, 927 R, 947, 953, 968, 969, 976, 982, 985, 986; 424—209